Chambers & Washam.
Rotary Cultivator.

No. 66,128.  Patented Jun. 25, 1867.

Witnesses:
Theo Tusche
J. A. Service

Inventors:
Geo. W. Chambers
Isham Washam
Per Munn & Co.
Attorneys

United States Patent Office.

GEORGE W. CHAMBERS AND ISHAM WASHAM OF TALLADEGA, ALABAMA.

Letters Patent No. 66,128, dated June 25, 1867.

COTTON-CULTIVATOR.

*The Schedule referred to in these Letters Patent and making part of the same.*

TO ALL WHOM IT MAY CONCERN:

Be it known that we, GEORGE W. CHAMBERS and ISHAM WASHAM, of Talladega, in the county of Talladega, and State of Alabama, have invented a new and useful Improvement in Cultivator and Cotton-Plant Thinner; and we do hereby declare that the following is a full, clear, and exact description thereof, which will enable others skilled in the art to make and use the same, reference being had to the accompanying drawings, forming part of this specification, in which—

Figure 1:
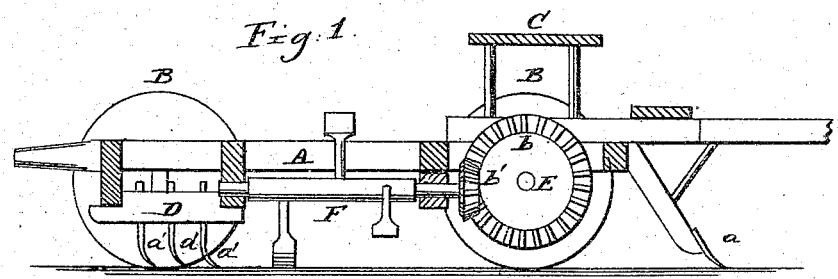

Figure 1 is a central vertical longitudinal section of our improved cultivator and cotton-plant thinner.

Figure 2:
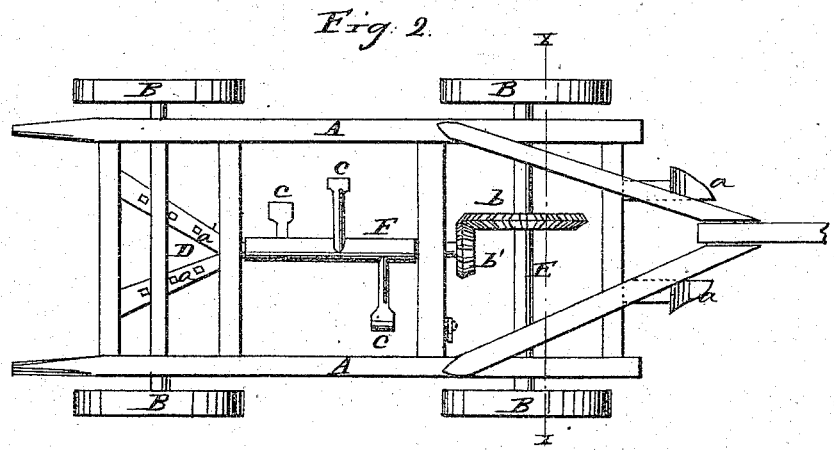

Figure 2, a top view.

Figure 3:
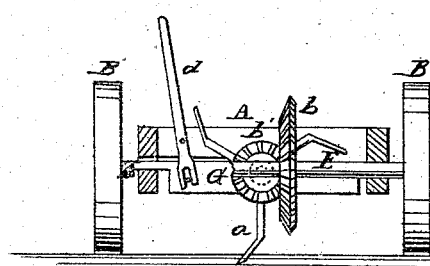

Figure 3, a vertical transverse section taken on the line $x$ $x$, fig. 2.

Similar letters of reference indicate like parts.

This invention relates to an improved machine for thinning and cultivating cotton plants, and consists in a four-wheeled-sulky carriage, to which are attached cultivators at the front and rear ends, and having bevel-gear connecting the front axle with a horizontal longitudinal shaft upon which are placed any required number of hoes or choppers for thinning the cotton plants in the row at regular distances apart, by their rotation as the carriage moves through the field, drawn by two or more horses. This machine accomplishes, in the work of thinning and hoeing cotton plants, as much as ten field hands on ordinary level land, and is a great labor-saving machine, of especial value to the country at this period of disorganized labor in the southern States, and when every effort is being made to extend the cultivation of our great staple crop to supply the demand of the world for cotton.

We are aware that cultivators and choppers or plant-thinning machines have been previously employed, but the improved arrangements we have introduced in the construction of our machine differ from any known to us, and are essential to the successful operation of such machines, as hereinafter particularly described.

A represents a long rectangular carriage-frame, mounted upon four wheels B B, and provided with the seat C for the driver. At the front end of the frame are placed ploughs or cultivators $a$ $a$, one in each side of the middle, at such distance apart as to straddle the row and throw off the earth on both sides of the plants. And at the rear end of the frame is placed a V-shaped frame, D, on which are fitted a set of cultivators, $a'$ $a'$, so arranged as to throw the soil back to the plants, and cultivate all the ground to the middle between the rows. Upon the axle E of the front wheels is fixed a bevel-wheel, $b$, gearing into the wheel $b'$ on the end of a shaft, F, running lengthwise of the carriage. This shaft is provided with any desired number of projecting hoes or choppers $c$ $c$, placed upon it at such distances apart, and related to each other diametrically in such a manner that as the carriage is moved forward the revolution of the shaft F, corresponding with the advance made by the rotation of the wheels through the action of the axle and the bevel-gear, shall strike the hoes or choppers in regular succession into the rows of cotton plants transversely, or nearly so, and make spaces between them for thinning them properly, instead of the ordinary hand-chopping with a hoe. To the top of the hoe-blades may be attached a small bar for pulverizing the earth if necessary. The hoes may be made adjustable to any required depth, and the edges of the blades set at such angles that the blade will not enter the earth entirely at once. The forward end of the shaft F has its bearing in a sliding cross-piece, G, fig. 3, operated by a hand-lever, $d$, placed convenient to the driver for disengaging the bevel-gear temporarily if desired, when passing over uneven ground, or transporting the machine from place to place. The machine can be so arranged as to suit rows of any width, the wheels always running in the water furrows.

It will be seen that by employing four wheels on our machine, it travels steadily, and will perform the work with much greater accuracy than a two-wheeled carriage, and by seating the driver on the carriage his attention will be required only in driving the team properly, which is a great advantage in the operation over that of a machine managed with handles by a driver walking in the rear.

Having described our invention, we claim as new, and desire to secure by Letters Patent—

The arrangement of the lever $d$ and the sliding cross-piece G, to engage and disengage the bevel-gear $b$ $b'$, in the manner and for the purpose herein specified.

The above specification of our invention signed by us this third day of April, 1866.

GEORGE W. CHAMBERS, his
ISHAM × WASHAM.
mark.

Witnesses:
J. M. SKAGGS,